(12) United States Patent
Ker et al.

(10) Patent No.: US 7,764,476 B2
(45) Date of Patent: Jul. 27, 2010

(54) POWER-RAIL ESD PROTECTION CIRCUIT WITHOUT LOCK-ON FAILURE

(75) Inventors: Ming-Dou Ker, Hsinchu (TW); Cheng-Cheng Yen, Hsinchu (TW); Tung-Yang Chen, Tainan County (TW)

(73) Assignees: Himax Technologies Limited, Sinshih Township, Tainan County (TW); National Chiao-Tung University, Hsinchu (TW)

( * ) Notice: Subject to any disclaimer, the term of this patent is extended or adjusted under 35 U.S.C. 154(b) by 77 days.

(21) Appl. No.: 12/018,224

(22) Filed: Jan. 23, 2008

(65) Prior Publication Data
US 2009/0086392 A1    Apr. 2, 2009

(30) Foreign Application Priority Data
Sep. 27, 2007    (TW) .............................. 96135891 A (51) Int. Cl.
*H02H 9/00*    (2006.01)
(52) U.S. Cl. ......................................................... 361/56
(58) Field of Classification Search .................... 361/56
See application file for complete search history.

(56) References Cited

U.S. PATENT DOCUMENTS

| | | | | |
|---|---|---|---|---|
| 6,690,561 B2* | 2/2004 | Hung et al. | ................. | 361/111 |
| 6,865,063 B2* | 3/2005 | Ball | ......................... | 361/93.9 |
| 7,522,395 B1* | 4/2009 | Tien et al. | ..................... | 361/56 |
| 2004/0046575 A1* | 3/2004 | Iwase | ......................... | 324/713 |
| 2007/0183104 A1* | 8/2007 | Tseng | ......................... | 361/56 |

* cited by examiner

*Primary Examiner*—Stephen W Jackson
*Assistant Examiner*—Angela Brooks
(74) *Attorney, Agent, or Firm*—Thomas, Kayden, Horstemeyer & Risley (57) ABSTRACT

An ESD protection circuit including a discharge device, a first detection circuit, and a second detection circuit. The discharge device provides a discharge path between a first power rail and a second power rail when the discharge device is activated. The discharge device stops providing the discharge path when the discharge device is de-activated. The first detection circuit is coupled between the first and the second power rails. The first detection circuit activates the discharge device when an ESD event occurs in the first power rail. The second detection circuit de-activates the discharge device when the ESD event does not occur in the first power rail.

20 Claims, 10 Drawing Sheets

POWER-RAIL ESD PROTECTION CIRCUIT WITHOUT LOCK-ON FAILURE

BACKGROUND OF THE INVENTION

1. Field of the Invention

The invention relates to an integrated circuit, and more particularly to an integrated circuit comprising an electrostatic discharge (ESD) protection device without lock-on failure.

2. Description of the Related Art

With the advancement of semiconductor manufacturing, protection against electrostatic discharge (ESD) has become one of the most critical reliability issues for integrated circuits (IC). Several ESD test modes, such as machine mode (MM) or human body mode (HBM), have been proposed to imitate the circumstances under which ESD occurs. The ability to withstand certain levels of ESD is essential for successful commercialization of an IC.

ESD protection is also a critical reliability issues for integrated circuits (IC). As semiconductor processes advance toward deep sub-micron manufacturing, resulting scaled-down devices and thinner gate oxides are more vulnerable to ESD stress. Generally, the input/output pads on IC chips must sustain at least 2 kVolt ESD of high stress in HBM or 200V in MM. Thus, the input/output pads on IC chips usually include ESD protection devices or circuits protecting the core circuit from ESD damage.

BRIEF SUMMARY OF THE INVENTION

ESD protection circuits are provided. An exemplary embodiment of an ESD protection circuit comprises a discharge device, a first detection circuit, and a second detection circuit. The discharge device provides a discharge path between a first power rail and a second power rail when the discharge device is activated. The discharge device stops providing the discharge path when the discharge device is de-activated. The first detection circuit is coupled between the first and the second power rails. The first detection circuit activates the discharge device when an ESD event occurs in the first power rail. The second detection circuit de-activates the discharge device when the ESD event does not occur in the first power rail.

Integrated circuits are also provided. An exemplary embodiment of an integrated circuit comprises a core circuit and an ESD protection circuit. The core circuit is coupled between the first and the second power rail. The ESD protection circuit comprises a discharge device, a first detection circuit, and a second detection circuit. The discharge device provides a discharge path between a first power rail and a second power rail when the discharge device is activated. The discharge device stops providing the discharge path when the discharge device is de-activated. The first detection circuit is coupled between the first and the second power rails. The first detection circuit activates the discharge device when an ESD event occurs in the first power rail. The second detection circuit de-activates the discharge device when the ESD event does not occur in the first power rail.

A detailed description is given in the following embodiments with reference to the accompanying drawings.

BRIEF DESCRIPTION OF THE DRAWINGS

The invention can be more fully understood by referring to the following detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
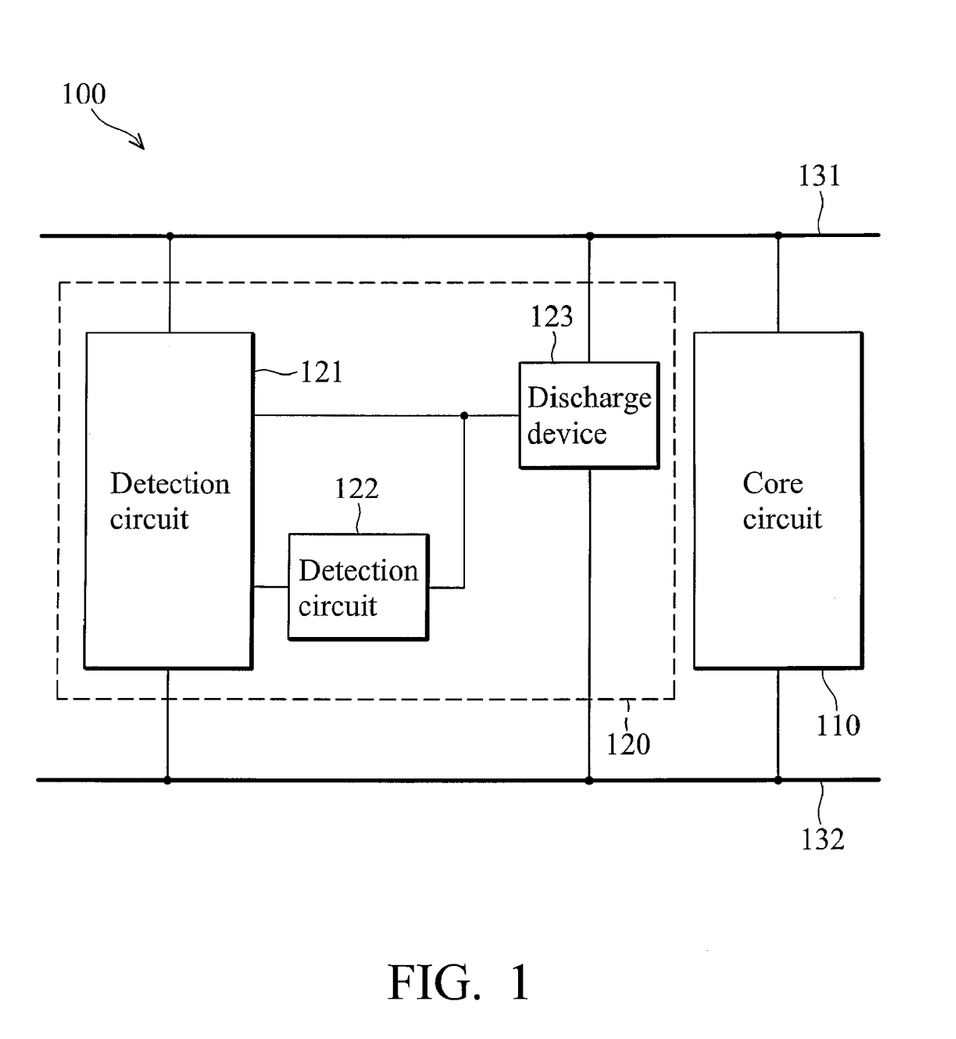
FIG. 1 is a schematic diagram of an exemplary embodiment of an integrated circuit.

FIG. 1 is a schematic diagram of an exemplary embodiment of an integrated circuit. The integrated circuit 100 comprises a core circuit 110 and an ESD protection circuit 120. The core circuit 110 and the ESD protection circuit 120 are coupled between power rails 131 and 132. When an ESD event occurs in the power rail 131 and the power rail 132 is grounded, the ESD protection circuit 120 dissipates ESD current to ground. Thus, the core circuit 110 is not affected by ESD current.

In normal mode (no ESD event), the ESD protection circuit 120 remains idle. At this time, the core circuit 110 operates according to voltage of the power rails 131 and 132. The core circuit 110 executes the corresponding functions according to the type of the integrated circuit 100. For example, if the integrated circuit 100 is an analog-to-digital converter, the core circuit 110 executes a transformation function to transform signals.

The ESD protection circuit 120 comprises detection circuits 121, 122, and a discharge device 123. The detection circuit 121 is coupled between the power rails 131 and 132. The detection circuit 121 activates the discharge device 123 when an ESD event occurs in the power rail 131. The detection circuit 122 de-activates the discharge device 123 when the ESD event does not occur in the power rail 131. When the discharge device 123 is activated, the discharge device 123 provides a discharge path between the power rails 131 and 132. When the discharge device 123 is de-activated, the discharge device 123 stops providing the discharge path.

Figure 2:
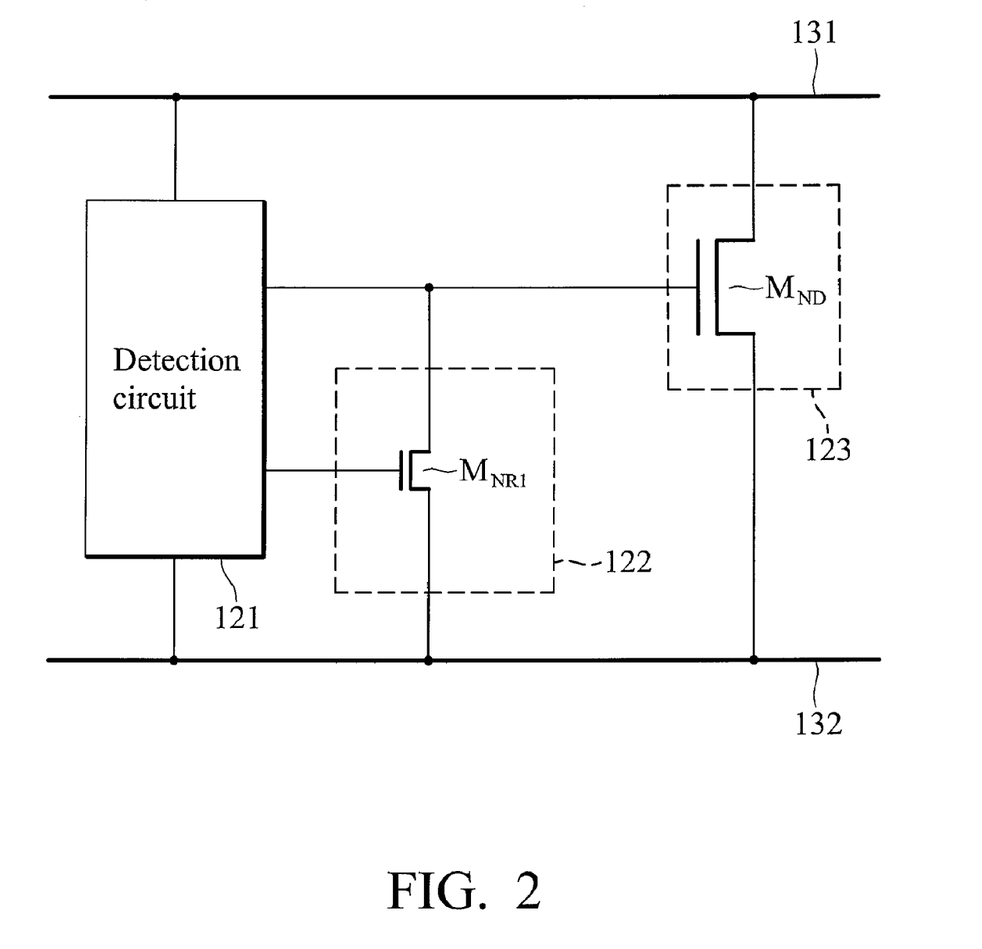
FIG. 2 is a schematic diagram of an exemplary embodiment of an ESD protection circuit.

FIG. 2 is a schematic diagram of an exemplary embodiment of an ESD protection circuit. In this embodiment, the discharge device 123 is an N-type transistor $M_{ND}$ and the detection circuit 122 is an N-type transistor $M_{NR1}$. For tolerating ESD current, the channel size of the N-type transistor $M_{ND}$ is larger.

When an ESD event occurs in the power rail 131 and the power rail 132 is grounded, the detection circuit 121 provides a high level to the N-type transistor $M_{ND}$ for activating the N-type transistor $M_{ND}$. Thus, the N-type transistor $M_{ND}$ provides a discharge path such that ESD current is dissipated to ground via the N-type transistor $M_{ND}$. When the ESD event does not occur in the power rail 131, the detection circuit 121 provides a high level to the N-type transistor $M_{NR1}$. Since the N-type transistor $M_{NR1}$ is turned on, the N-type transistor $M_{ND}$ is de-activated. Thus, the N-type transistor $M_{ND}$ stops providing the discharge path such that a lock-on failure does not occur in the ESD protection circuit.

Figure 3:
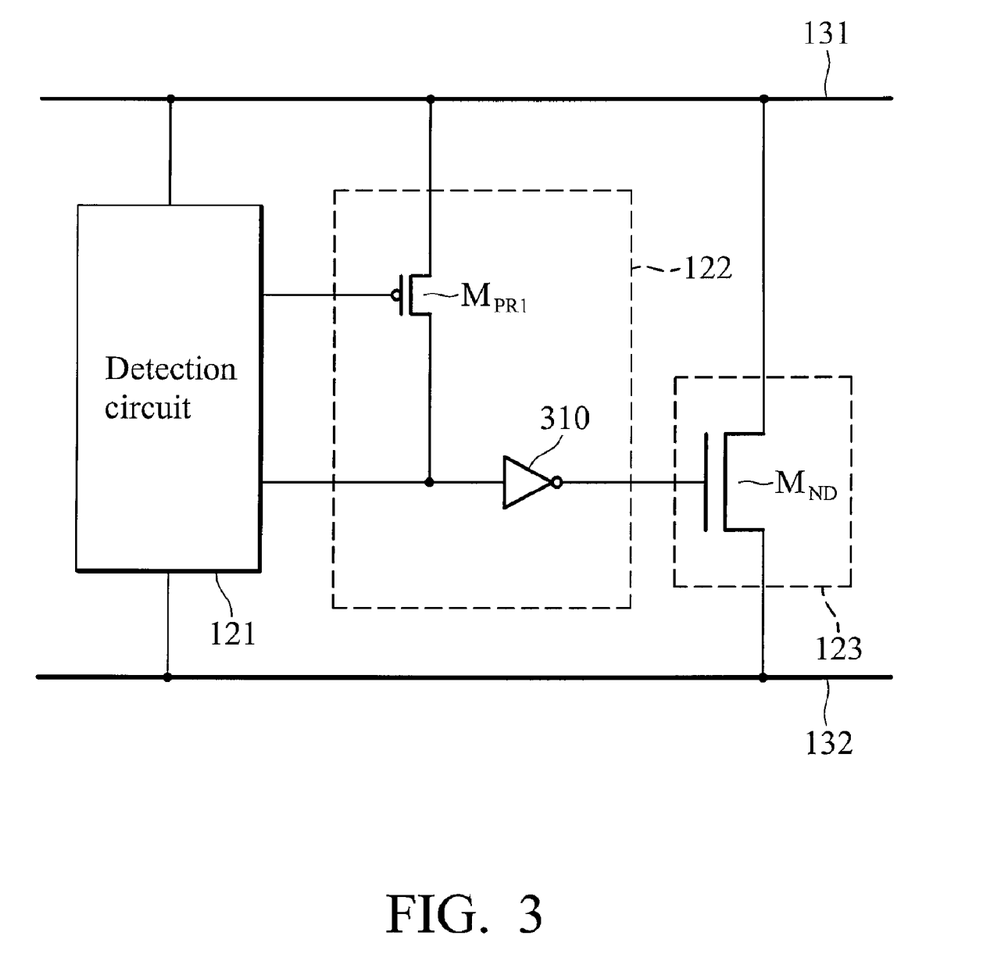
FIG. 3 is a schematic diagram of another exemplary embodiment of the ESD protection circuit.

FIG. 3 is a schematic diagram of another exemplary embodiment of the ESD protection circuit. In this embodiment, the discharge device 123 is an N-type transistor $M_{ND}$, and the detection circuit 122 comprises a P-type transistor $M_{PR1}$ and an inverter unit 310. When an ESD event occurs in the power rail 131 and the power rail 132 is grounded, the detection circuit 121 provides a low level to the inverter unit 310 for activating the N-type transistor $M_{ND}$. Thus, the N-type transistor $M_{ND}$ provides a discharge path such that ESD current is dissipated to ground via the N-type transistor $M_{ND}$.

When the ESD event does not occur in the power rail 131, the detection circuit 121 provides a low level to the P-type transistor $M_{PR1}$. Since the P-type transistor $M_{PR1}$ is turned on, the input terminal of the inverter unit 310 is at a high level for de-activating the N-type transistor $M_{ND}$. Thus, the N-type transistor $M_{ND}$ stops providing the discharge path such that a lock-on failure does not occur in the ESD protection circuit.

Figure 4:
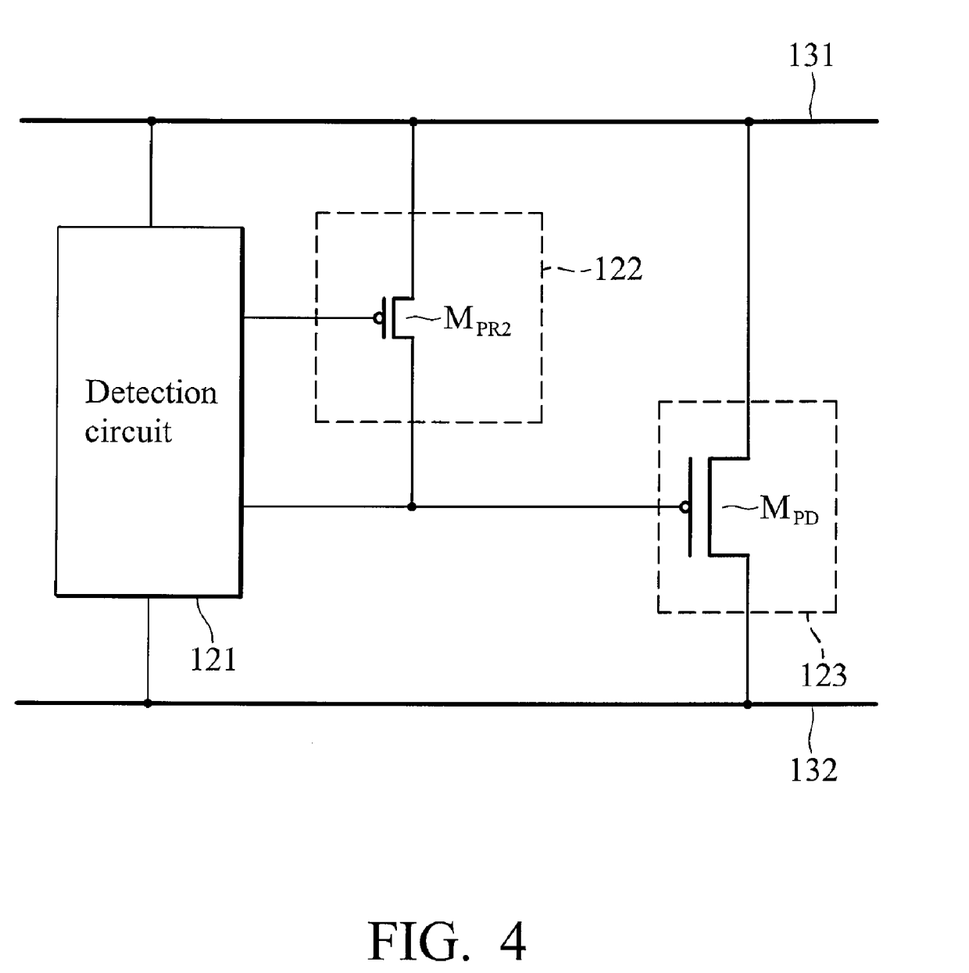
FIG. 4 is a schematic diagram of another exemplary embodiment of the ESD protection circuit.

FIG. 4 is a schematic diagram of another exemplary embodiment of the ESD protection circuit. In this embodiment, the discharge device 123 is a P-type transistor $M_{PD}$, and the detection circuit 122 comprises a P-type transistor $M_{PR2}$. When an ESD event occurs in the power rail 131 and the power rail 132 is grounded, the detection circuit 121 provides a low level to the P-type transistor $M_{PD}$ for activating the P-type transistor $M_{PD}$. Thus, ESD current is dissipated to ground via the P-type transistor $M_{PD}$. When the ESD event does not occur in the power rail 131, the detection circuit 121 provides a low level to the P-type transistor $M_{PR2}$. Since the P-type transistor $M_{PR2}$ is turned on, the P-type transistor $M_{PD}$ is de-activated. Thus, the P-type transistor $M_{PD}$ stops providing the discharge path.

Figure 5:
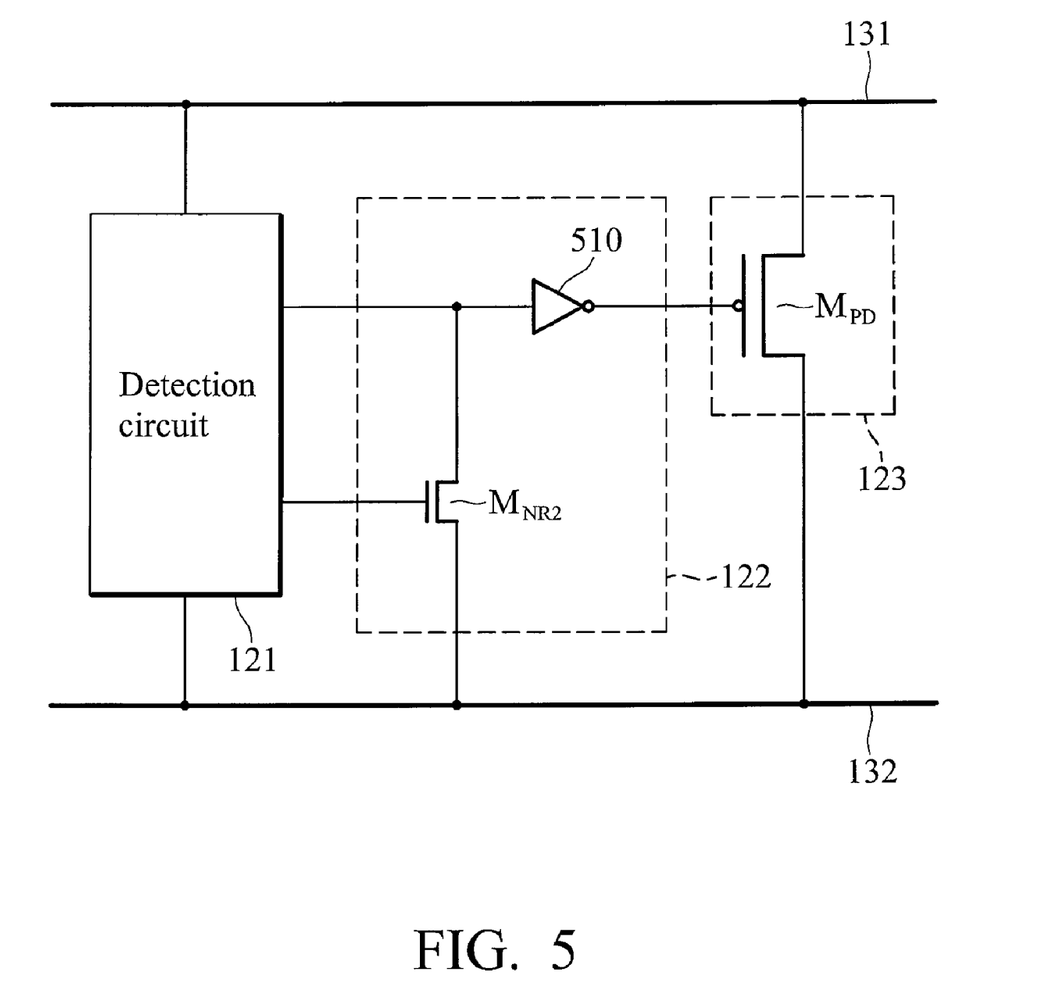
FIG. 5 is a schematic diagram of another exemplary embodiment of the ESD protection circuit.

FIG. 5 is a schematic diagram of another exemplary embodiment of the ESD protection circuit. In this embodiment, the discharge device 123 is a P-type transistor $M_{PD}$, and the detection circuit 122 comprises an N-type transistor $M_{NR2}$ and an inverter unit 510. When an ESD event occurs in the power rail 131 and the power rail 132 is grounded, the detection circuit 121 provides a high level to the inverter unit 510 for activating the P-type transistor $M_{PD}$. Thus, the P-type transistor $M_{PD}$ provides a discharge path such that ESD current is dissipated to ground via the P-type transistor $M_{PD}$. When the ESD event does not occur in the power rail 131, the detection circuit 121 provides a high level to the N-type transistor $M_{NR2}$. Since the N-type transistor $M_{NR2}$ is turned on, the input terminal of the inverter unit 510 is at a low level for de-activating the P-type transistor $M_{PD}$. Thus, the P-type transistor $M_{PD}$ stops providing the discharge path.

Figure 6A:
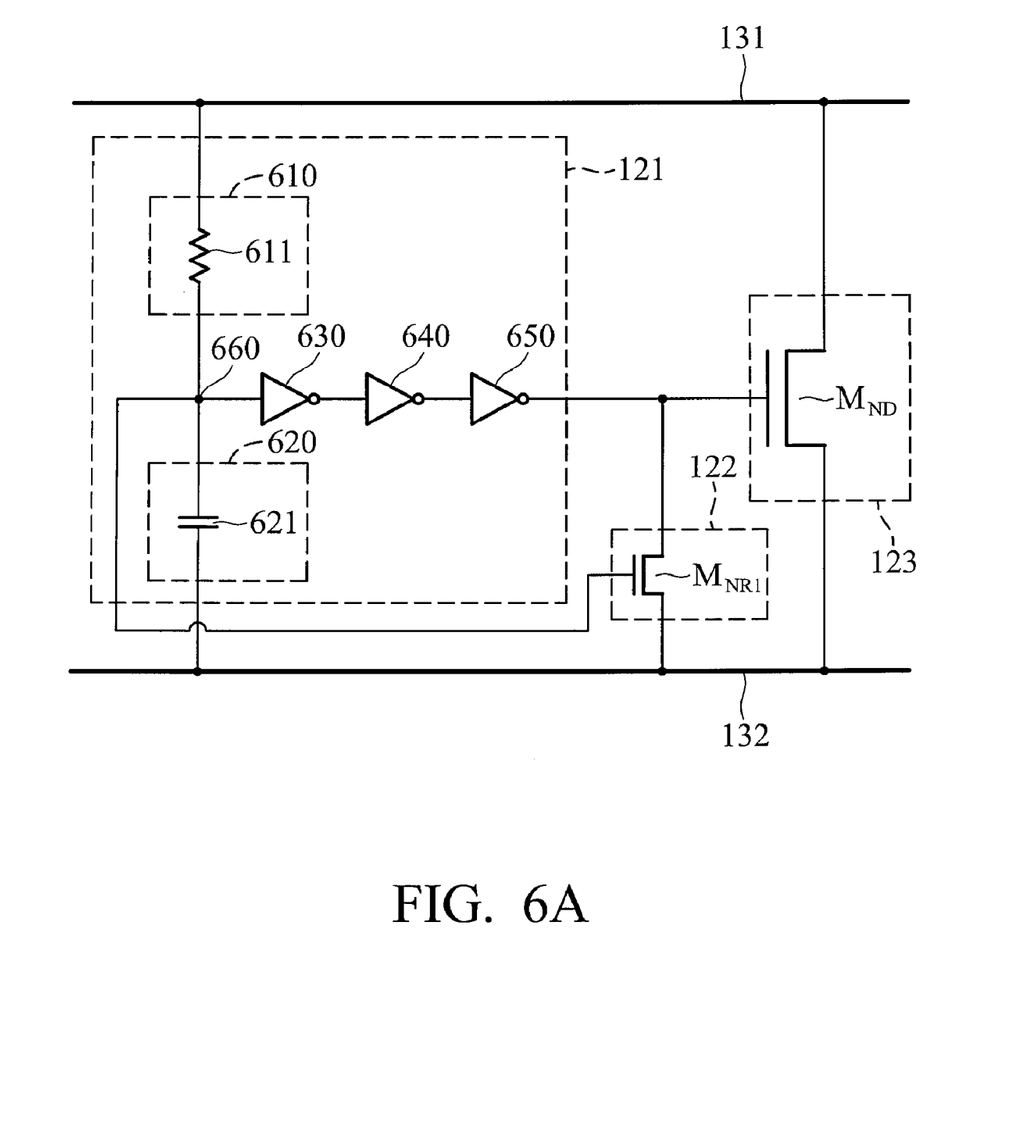
FIG. 6A is a schematic diagram of an exemplary embodiment of the detection circuit shown in FIG. 2.

FIG. 6A is a schematic diagram of an exemplary embodiment of the detection circuit 121 shown in FIG. 2. The detection circuit 121 comprises an impedance unit 610, a capacitor unit 620, and inverter units 630-650. The impedance unit 610 provides impedance. The capacitor unit 620 connects with the impedance unit 610 in parallel between the power rails 131 and 132. The capacitor unit 620 and the impedance unit 610 connect to a node 660. In this embodiment, the impedance unit 610 is a resistor 611 and the capacitor unit 620 is a capacitor 621. The impedance of the resistor 611 and the capacitance of the capacitor 621 determine a delay constant. The delay constant exceeds the duration of the ESD pulse and is less than the initial rising time of the power signal of the power rail 131.

When an ESD event occurs in the power rail 131 and the power rail 132 is grounded, since the delay constant exceeds the duration of the ESD pulse, the node 660 is at a low level. The discharge device 123 is activated by the inverter units 630-650. When the ESD event does not occur in the power rail 131, since the delay constant is less than the initial rising time of the power signal of the power rail 131, the node 660 is at a high level. When the N-type transistor $M_{NR1}$ is turned on, the discharge device 123 is de-activated.

In this embodiment, since the channel size of the discharge device 123 is larger, the inverter units 630-650 are connected in series between the node 660 and the discharge device 123 for increasing the driving capability of the detection circuit 121s. Thus, the detection circuit 121 is capable of activating the discharge device 123. In some embodiments, the number of the inverter units can be changed. Additionally, each inverter unit is composed by a P-type transistor and an N-type transistor. Since methods for composing the inverter unit are well known to those skilled in the field, descriptions of the methods are omitted for brevity.

Figure 6B:
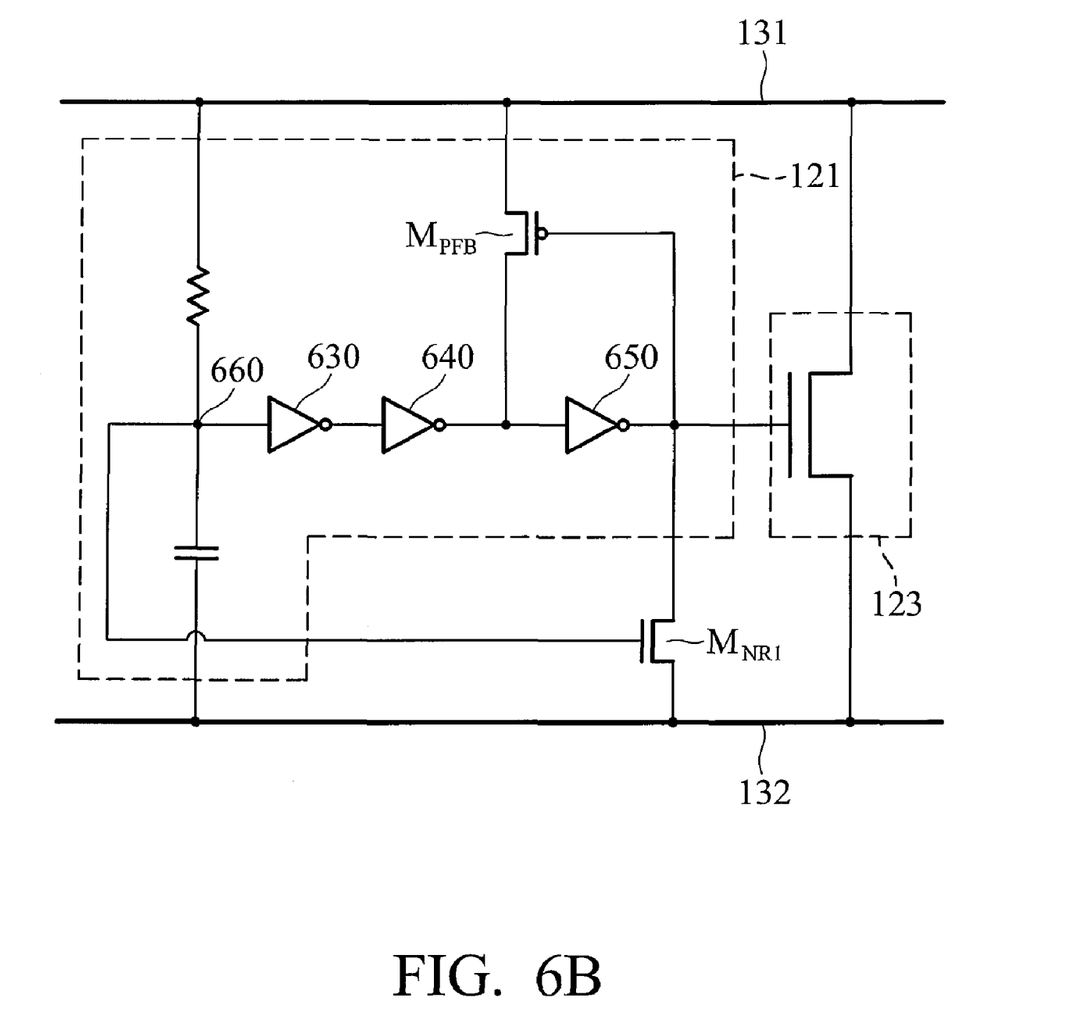
FIGS. 6B~6D are schematic diagrams of other exemplary embodiments of the detection circuit 121 shown in FIG. 2.

FIG. 6B is a schematic diagram of another exemplary embodiment of the detection circuit 121 shown in FIG. 2. FIG. 6B is similar to FIG. 6A except for the addition of a P-type transistor $M_{PFB}$. In this embodiment, the P-type transistor $M_{PFB}$ serves as a feedback path for avoiding the discharge device 123 activated in a fast boot state.

The channel size of the P-type transistor $M_{PFB}$ may exceed the channel size of the transistor of the inverter unit. When an ESD event occurs in the power rail 131, although the node 660 is at a high level, the output terminal of the inverter unit 650 may be maintained at a high level. Thus, the inverter unit 650 would not de-activate the discharge device 123. However, the N-type transistor $M_{NR1}$ can change the level of the output terminal of the inverter unit 650 from the high level to the low level. Thus, the discharge device 123 is de-activated. When the channel size of the N-type transistor $M_{NR1}$ increases, the de-activated speed of the discharge device 123 does, as well.

Figure 6C:
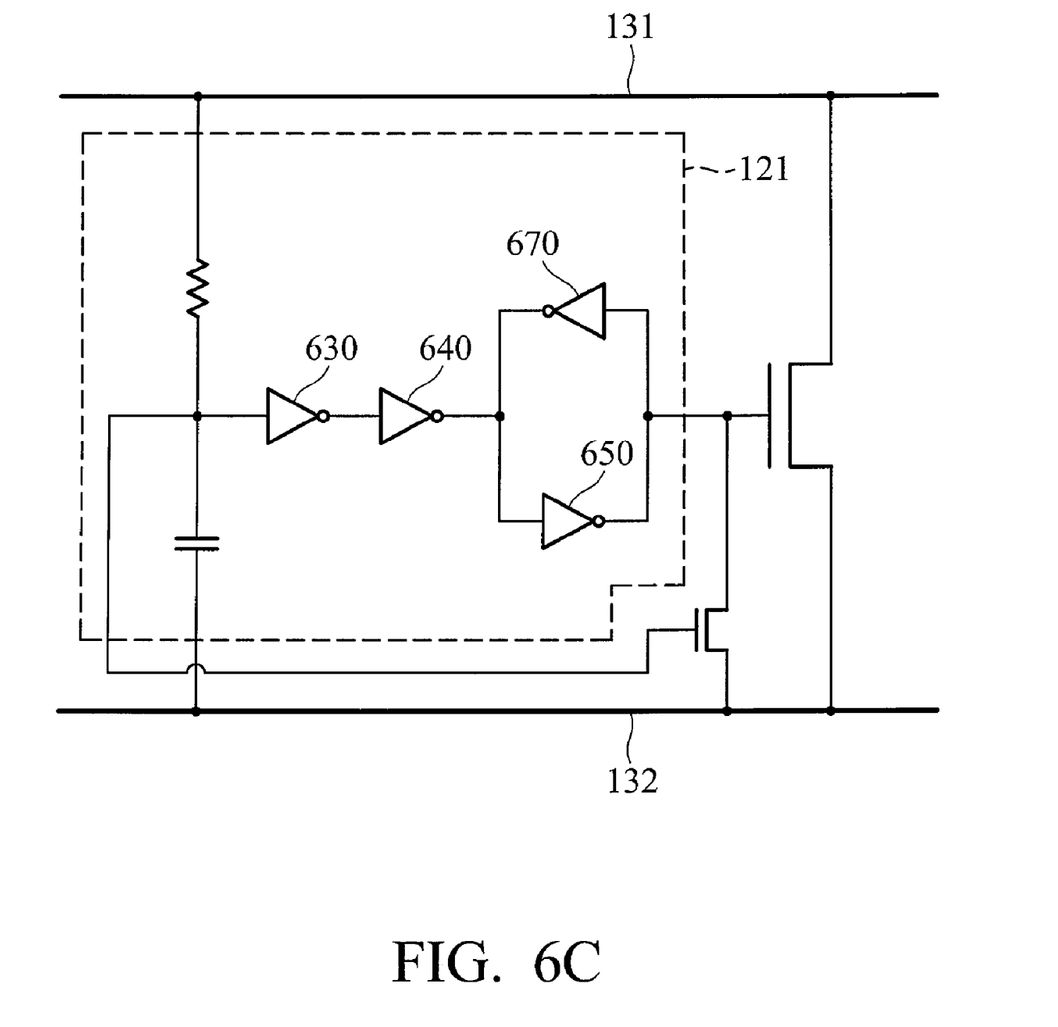

FIG. 6C is a schematic diagram of another exemplary embodiment of the detection circuit 121 shown in FIG. 2. FIG. 6C is similar to FIG. 6A except for the addition of an inverter unit 670. The inverter units 650 and 670 compose a feedback unit for ensuring that the discharge device continuously provides a discharge path when an ESD event occurs in the power rail 131.

Figure 6D:
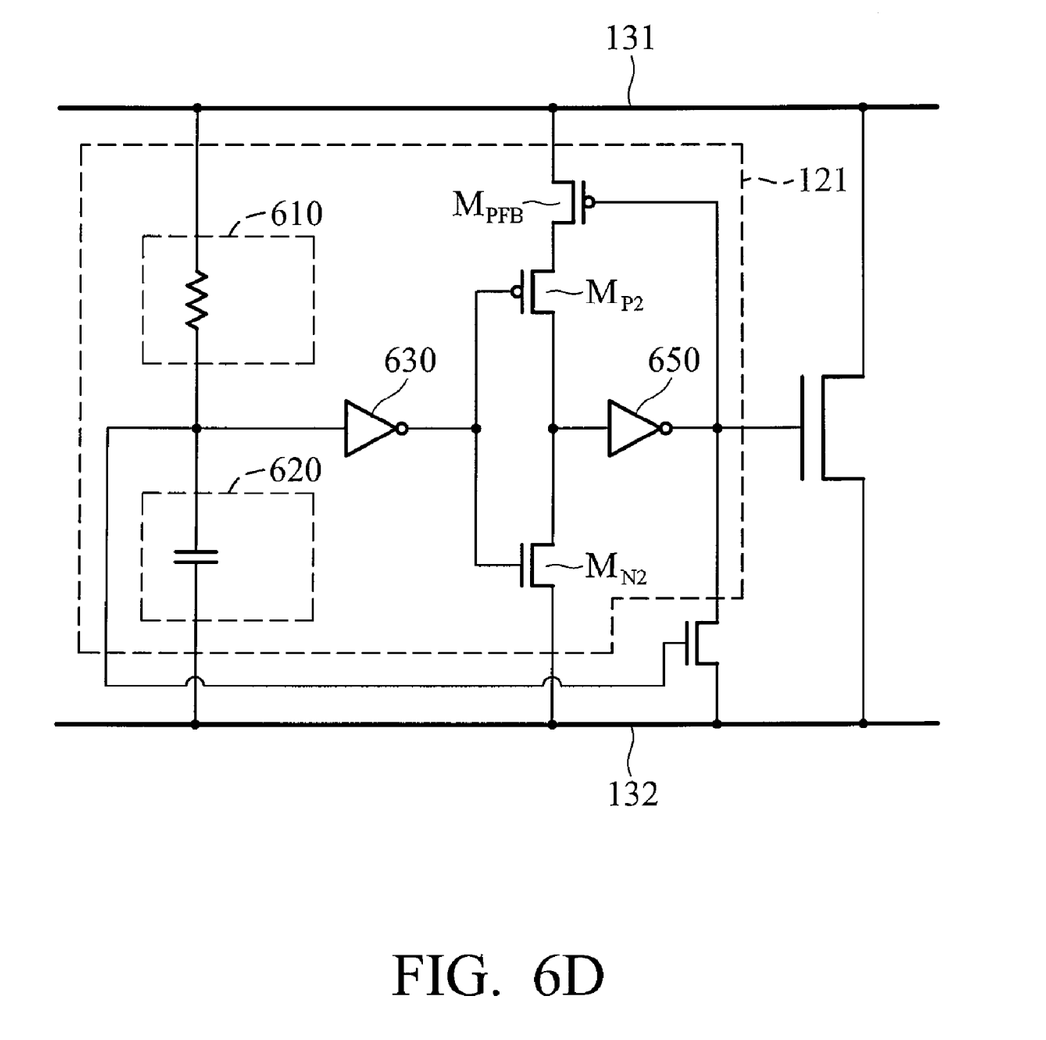

FIG. 6D is a schematic diagram of another exemplary embodiment of the detection circuit 121 shown in FIG. 2. The detection circuit 121 comprises an impedance unit 610, a capacitor unit 620, inverter units 630, 650, and transistors $M_{PFB}$, $M_{P2}$, and $M_{N2}$. If the transistor $M_{P2}$ is serially connected to the transistor $M_{N2}$ between the power rails s 131 and 132, an inverter unit is composed. In this embodiment, transistor $M_{PFB}$ is serially connected to the transistor $M_{P2}$ between the power rail 131 and the transistor $M_{N2}$. The transistors $M_{PFB}$ serves as a feedback path for ensuring that the discharge device continuously provides a discharge path when an ESD event occurs in the power rail 131.

Figure 7:
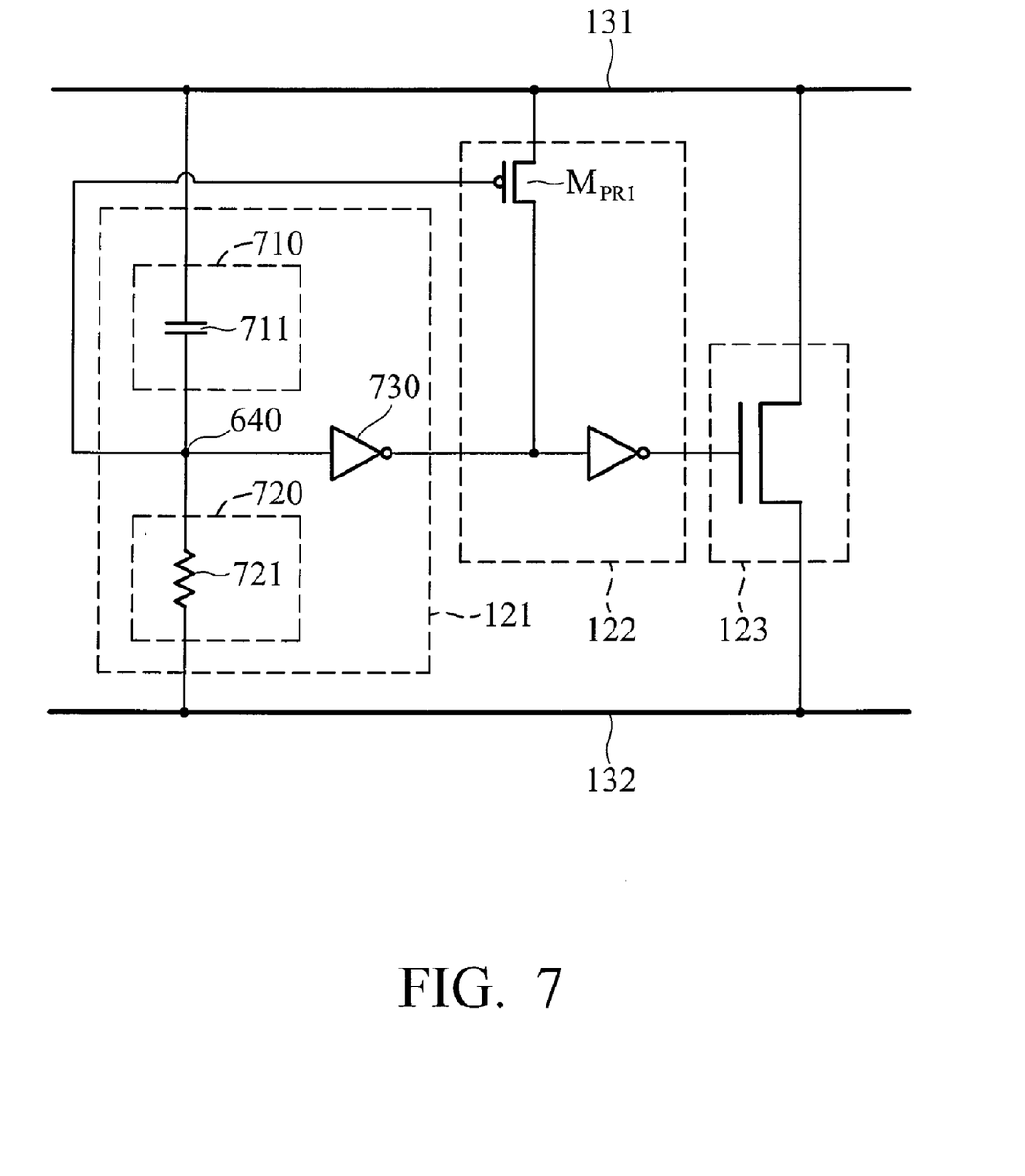
FIG. 7 is a schematic diagram of another exemplary embodiment of the detection circuit 121 shown in FIG. 3.

FIG. 7 is a schematic diagram of another exemplary embodiment of the detection circuit 121 shown in FIG. 3. The detection circuit 121 comprises a capacitor unit 710, an impedance unit 720, and an inverter unit 730. In this embodiment, the capacitor unit 710 is a capacitor 711 and the impedance unit 720 is a resistor 721. When an ESD event occurs in the power rail 131, a node 640 is at a high level according to the characteristic of the capacitor 711. Thus, the discharge device 123 is activated to provide a discharge path. When the ESD event does not occur in the power rail 131, the node 640 is at a low level for turning on the transistor $M_{PR1}$. Thus, the discharge device 123 is de-activated to stop providing the discharge path.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An electrostatic discharge (ESD) protection circuit, comprising:
    a discharge device which provides a discharge path between a first power rail and a second power rail when the discharge device is activated and stops providing the discharge path when the discharge device is de-activated;
    a first detection circuit coupled between the first and the second power rails, wherein the first detection circuit providing a first activating signal and a second activating signal; and
    a second detection circuit connected to the first detection circuit,
    wherein the first detection circuit activates the discharge device using the first activating signal when an ESD event occurs in the first power rail and the first detection circuit activates the second detection circuit using the second activating signal when an ESD event does not occur in the first power rail, which in turn disable the first activating signal to de-activate the discharge device.

2. The ESD protection circuit as claimed in claim 1, wherein the discharge device is a first N-type transistor comprising a gate coupled to the first activating signal, a drain coupled to the first power rail, and a source coupled to the second power rail, wherein the second detection circuit comprises a second N-type transistor comprising a gate coupled to the second activating signal, a drain coupled to the gate of the first N-type transistor, and a source coupled to the second power rail.

3. The ESD protection circuit as claimed in claim 2, wherein the first detection circuit comprises:
    an impedance unit coupled between the first power rail and a first node outputting the second activating signal;
    a capacitor unit coupled between the first node and the second power rail,
    a first inverter unit comprising a first input terminal coupled to the first node and a first output terminal;
    a second inverter unit comprising a second input terminal coupled to the first output terminal and a second output terminal; and
    a third inverter unit comprising a third input terminal coupled to the second output terminal and a third output terminal outputting the first activating signal and coupled to the gate of the first N-type transistor.

4. The ESD protection circuit as claimed in claim 2, wherein the first detection circuit comprises:
    an impedance unit coupled between the first power rail and a first node outputting the second activating signal;
    a capacitor unit coupled between the first node and the second power rail,
    a first inverter unit comprising a first input terminal coupled to the first node and a first output terminal;
    a second inverter unit comprising a second input terminal coupled to the first output terminal and a second output terminal;
    a third inverter unit comprising a third input terminal coupled to the second output terminal and a third output terminal outputting the first activating signal and coupled to the gate of the first N-type transistor; and
    a P-type transistor comprising a gate coupled to the gate of the first N-type transistor, a source coupled to the first power rail, and a drain coupled to the third input terminal.

5. The ESD protection circuit as claimed in claim 2, wherein the first detection circuit comprises:
    an impedance unit coupled between the first power rail and a first node outputting the second activating signal;
    a capacitor unit coupled between the first node and the second power rail,
    a first inverter unit comprising a first input terminal coupled to the first node and a first output terminal;
    a second inverter unit comprising a second input terminal coupled to the first output terminal and a second output terminal;
    a third inverter unit comprising a third input terminal coupled to the second output terminal and a third output terminal outputting the first activating signal and coupled to the gate of the first N-type transistor; and
    a fourth inverter unit comprising a fourth input terminal coupled to the third output terminal and a fourth output terminal coupled to the third input terminal.

6. The ESD protection circuit as claimed in claim 2, wherein the first detection circuit comprises:
    an impedance unit coupled between the first power rail and a first node outputting the second activating signal;
    a capacitor unit coupled between the first node and the second power rail,
    a first inverter unit comprising a first input terminal coupled to the first node and a first output terminal;
    a second inverter unit comprising a second input terminal and a second output terminal coupled to the gate of the first N-type transistor;
    a third inverter unit comprising a first P-type transistor and a third N-type transistor, wherein the first P-type transistor comprises a gate coupled to the first output terminal, a source, and a drain coupled to the second input terminal, and the third N-type transistor comprises a gate coupled to the first output terminal, a source coupled to the second power rail, and a drain coupled to the second input terminal; and
    a second P-type transistor comprising a gate coupled to the gate of the first N-type transistor, a source coupled to the first power rail, and a drain coupled to the source of the first P-type transistor.

7. The ESD protection circuit as claimed in claim 1, wherein the second detection circuit comprises:
    a P-type transistor comprising a gate coupled to the second activating signal, a source coupled to the first power rail, and a drain coupled to the first activating signal; and
    a first inverter unit comprising a first input terminal coupled to the drain of the P-type transistor and a first output terminal, wherein the discharge device is a first N-type transistor comprising a gate coupled to the first output terminal, a drain coupled to the first power rail, and a source coupled to the second power rail.

8. The ESD protection circuit as claimed in claim 7, wherein the first detection circuit comprises:
    a capacitor unit coupled between the first power rail and a first node outputting the second activating signal;
    an impedance unit coupled between the first node and the second power rail; and
    a second inverter unit comprising a second input terminal coupled to the first node and a second output terminal outputting the first activating signal and coupled to the first input terminal of the first inverter unit.

9. The ESD protection circuit as claimed in claim 1, wherein the discharge device is a first P-type transistor comprising a gate coupled to the first activating signal, a source coupled to the first power rail, and a drain coupled to the second power rail, and wherein the second detection circuit comprises a second P-type transistor comprising a gate coupled to the second activating signal, a source coupled to the first power rail, and a drain coupled to the gate of the first P-type transistor.

10. The ESD protection circuit as claimed in claim 1, wherein the second detection circuit comprises:
   an inverter unit comprising an input terminal coupled to the first activating signal and an output terminal; and
   an N-type transistor comprising a gate coupled to the second activating signal, a drain coupled to the input terminal and a source coupled to the second power rail;
wherein the discharge device is a first P-type transistor comprising a gate coupled to the output terminal, a source coupled to the first power rail, and a drain coupled to the second power rail.

11. An integrated circuit, comprising:
   a core circuit coupled between a first power rail and a second power rail; and
   an ESD protection circuit comprising:
      a discharge device which provides a discharge path between the first and the second power rails when the discharge device is activated and stops providing the discharge path when the discharge device is de-activated;
      a first detection circuit coupled between the first and the second power rails, wherein the first detection circuit providing a first activating signal and a second activating signal; and
      a second detection circuit connected to the first detection circuit,
      wherein the first detection circuit activates the discharge device using the first activating signal when an ESD event occurs in the first power rail and the first detection circuit activates the second detection circuit using the second activating signal when an ESD event does not occur in the first power rail, which in turn disable the first activating signal to de-activate the discharge device.

12. The integrated circuit as claimed in claim 11, wherein the discharge device is a first N-type transistor comprising a gate coupled to first activating signal, a drain coupled to the first power rail, and a source coupled to the second power rail, and wherein the second detection circuit comprises a second N-type transistor comprising a gate coupled to the second activating signal, a drain coupled to the gate of the first N-type transistor, and a source coupled to the second power rail.

13. The integrated circuit as claimed in claim 12, wherein the first detection circuit comprises:
   an impedance unit coupled between the first power rail and a first node outputting the second activating signal
   a capacitor unit coupled between the first node and the second power rail,
   a first inverter unit comprising a first input terminal coupled to the first node and a first output terminal;
   a second inverter unit comprising a second input terminal coupled to the first output terminal and a second output terminal; and
   a third inverter unit comprising a third input terminal coupled to the second output terminal and a third output terminal outputting the first activating signal and coupled to the gate of the first N-type transistor.

14. The integrated circuit as claimed in claim 12, wherein the first detection circuit comprises:
   an impedance unit coupled between the first power rail and a first node outputting the second activating signal;
   a capacitor unit coupled between the first node and the second power rail,
   a first inverter unit comprising a first input terminal coupled to the first node and a first output terminal;
   a second inverter unit comprising a second input terminal coupled to the first output terminal and a second output terminal;
   a third inverter unit comprising a third input terminal coupled to the second output terminal and a third output terminal outputting the first activating signal and coupled to the gate of the first N-type transistor; and
   a P-type transistor comprising a gate coupled to the gate of the first N-type transistor, a source coupled to the first power rail, and a drain coupled to the third input terminal.

15. The integrated circuit as claimed in claim 12, wherein the first detection circuit comprises:
   an impedance unit coupled between the first power rail and a first node outputting the second activating signal;
   a capacitor unit coupled between the first node and the second power rail,
   a first inverter unit comprising a first input terminal coupled to the first node and a first output terminal;
   a second inverter unit comprising a second input terminal coupled to the first output terminal and a second output terminal;
   a third inverter unit comprising a third input terminal coupled to the second output terminal and a third output terminal outputting the first activating signal and coupled to the gate of the first N-type transistor; and
   a fourth inverter unit comprising a fourth input terminal coupled to the third output terminal and a fourth output terminal coupled to the third input terminal.

16. The integrated circuit as claimed in claim 12, wherein the first detection circuit comprises:
   an impedance unit coupled between the first power rail and the first node;
   a capacitor unit coupled between the first node and the second power rail,
   a first inverter unit comprising a first input terminal coupled to the first node and a first output terminal;
   a second inverter unit comprising a second input terminal and a second output terminal coupled to the gate of the first N-type transistor;
   a third inverter unit comprising a first P-type transistor and a third N-type transistor, wherein the first P-type transistor comprises a gate coupled to the first output terminal, a source, and a drain coupled to the second input terminal, and the third N-type transistor comprises a gate coupled to the first output terminal, a source coupled to the second power rail, and a drain coupled to the second input terminal; and
   a second P-type transistor comprising a gate coupled to the gate of the first N-type transistor, a source coupled to the first power rail, and a drain coupled to the source of the first P-type transistor.

17. The integrated circuit as claimed in claim 11, wherein the second detection circuit comprises:
   a P-type transistor comprising a gate coupled to the second activating signal, a source coupled to the first power rail, and a drain coupled to the first activating signal; and a first inverter unit comprising a first input terminal coupled to the drain of the P-type transistor and a first output terminal, wherein the discharge device is a first N-type transistor comprising a gate coupled to the first output terminal, a drain coupled to the first power rail, and a source coupled to the second power rail.

18. The integrated circuit as claimed in claim 17, wherein the first detection circuit comprises:
   a capacitor unit coupled between the first power rail and a first node outputting the second activating signal;
   an impedance unit coupled between the first node and the second power rail; and
   a second inverter unit comprising a second input terminal coupled to the first node and a second output terminal outputting the first activating signal and coupled to the first input terminal of the first inverter unit.

19. The integrated circuit as claimed in claim 11, wherein the discharge device is a first P-type transistor comprising a gate coupled to the first activating signal, a source coupled to the first power rail, and a drain coupled to the second power rail, and wherein the second detection circuit comprises a second P-type transistor comprising a gate coupled to the second activating signal, a source coupled to the first power rail, and a drain coupled to the gate of the first P-type transistor.

20. The integrated circuit as claimed in claim 11, wherein the second detection circuit comprises:
   an inverter unit comprising an input terminal coupled to the first activating signal and an output terminal; and
   an N-type transistor comprising a gate coupled to the second activating signal, a drain coupled to the input terminal and a source coupled to the second power rail;
wherein the discharge device is a first P-type transistor comprising a gate coupled to the output terminal, a source coupled to the first power rail, and a drain coupled to the second power rail.

* * * * *